Sept. 27, 1966  R. R. RABENOLD  3,275,734
METHOD OF CASTING SHEET-LIKE ARTICLES
Filed Aug. 22, 1961  2 Sheets-Sheet 1
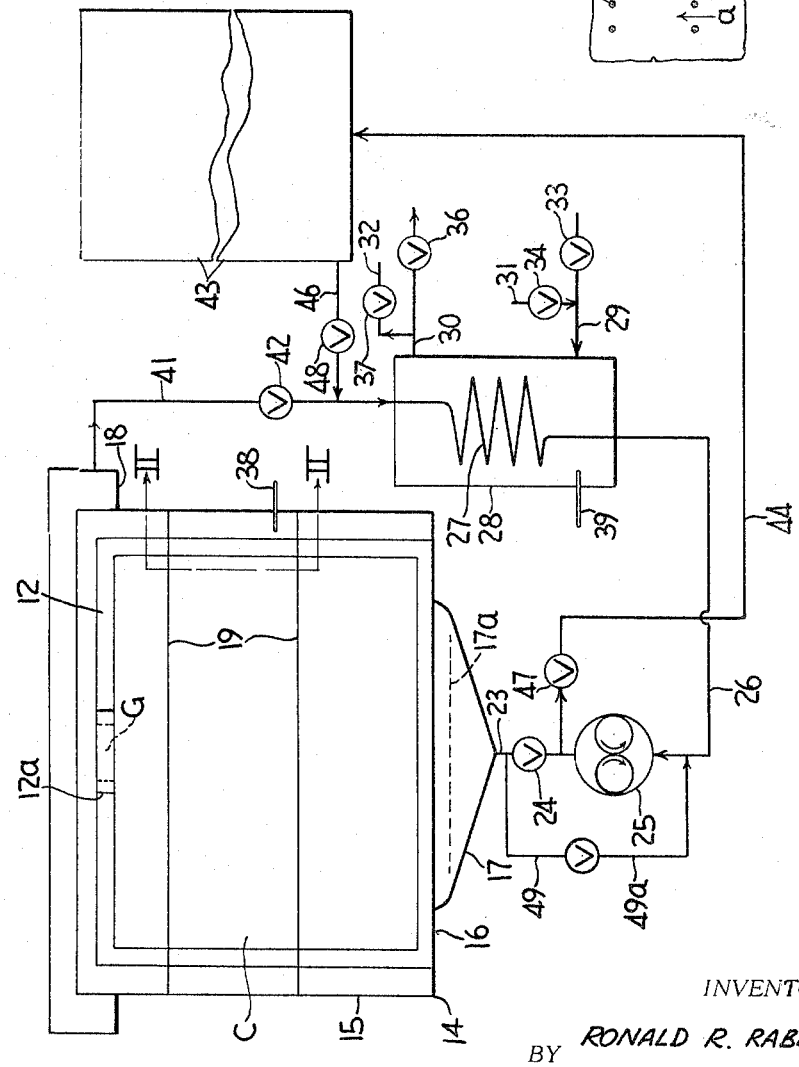
INVENTOR.
RONALD R. RABENOLD
BY Oscar L. Spencer
ATTORNEY Sept. 27, 1966  R. R. RABENOLD  3,275,734
METHOD OF CASTING SHEET-LIKE ARTICLES
Filed Aug. 22, 1961  2 Sheets-Sheet 2

INVENTOR.
RONALD R. RABENOLD
BY Oscar L. Spencer
ATTORNEY

United States Patent Office 3,275,734
Patented Sept. 27, 1966

3,275,734
METHOD OF CASTING SHEET-LIKE ARTICLES
Ronald R. Rabenold, Allison Park, Pa., assignor to Pittsburgh Plate Glass Company, Pittsburgh, Pa., a corporation of Pennsylvania
Filed Aug. 22, 1961, Ser. No. 133,230
1 Claim. (Cl. 264—316)

This invention relates to the preparation in an appropriate cell of a casting of a material which by polymerization or interpolymerization forms solid, resinous bodies, and in so doing is subject to a substantial degree of shrinkage; and it has particular relation to the formation of a casting of the foregoing material, the surfaces of said casting being free of release marks from the cell in which it is formed, and from other defects which have heretofore characterized many castings formed from the foregoing material by use-recognized methods and apparatus.

It has heretofore been disclosed to form in suitable cells, castings of polymerizable or interpolymerizable materials, such as acrylic esters or alpha-chloroacrylic esters, or interpolymers of $>C=CH_2$ monomers and polyesters of alpha, beta-ethylenic dicarboxylic acids and polyhydric alcohols. The casting techniques are particularly applicable to the formation of sheet or plate-like bodies of materials useful as substitutes for glass in order to provide glazing for vehicles, airplanes, boats, and the like, which are of light weight, which have a capacity for bending without breaking, and which do not liberate dangerous shards if broken.

In forming such bodies, very smooth, uniform surfaces are desirable or essential and in order to provide the same, it has been disclosed to form casting cells for the bodies of a pair of plates, such as plates of sheet glass or of ground and polished glass, or of polished metal, the plates being disposed in spaced and usually parallel relationship with the edges thereof in substantially coextensive position, and the space between the edges being sealed with a spaced strip of plastic material. In many instances, the edges of the plates of glass were actuated toward each other to press the sides of the spacer strip by clamps actuated by screws or springs. A closed cell was thus provided having very smooth interior faces which would retain the liquid resin components while they were being cast. The liquid material in the cell was then cured in a heated oven by contact with a heated, gaseous medium, such as hot air. Ultimately, the castings were cured, for example, in an oven, and could be freed from the casting cell by removing the clamps from the faces of the plates to allow separation of the latter from the spacing strip. In this way, freestanding bodies were obtained having surfaces which desirably were of a polish corresponding to that of the plates of glass against which they were cured.

This process, although useful in forming castings, had certain serious shortcomings which have not heretofore been overcome. Among the highly important problems encountered was a strong tendency of the liquid resin-forming materials to undergo excessive thermal rise. The exothermal rise might cause cracking of the castings or even of the glass constituting the cells. It might also produce discoloration of the resin, a defect which was most objectionable in a glazing material such as might be employed in a boat, vehicle, airplane, or even in a building. The shrinkage in curing at elevated temperatures was very considerable and also quite rapid, and as a result, internal stresses were set up in the castings which might result in warpage or in cracking or other defects. The shrinkage was so great that the resin, as it hardened, tended prematurely to pull free from the surface of the glass in irregular cleavage areas or patches, while the remaining resin in contiguity to these patches retained its contact with the glass surfaces, thus setting up surface tension effects and perhaps other effects which caused the resin in said cleavage areas to be depressed, and thus imparted highly objectionable irregularities, such as lakes and "worm" tracks, to the surface of the casting. In the instance of large castings requiring the use of large plates, the hydrostatic head at the lower edge of the cell could be quite substantial if the cells were set on edge. This pressure might bow the plates or open the seams between the plates and the sealing members.

In an effort to eliminate some of these effects, as for instance, the premature separation of the resin from the glass at the interface between the two, it has been disclosed to form casting cells for the foregoing resin-forming materials by sealing the spaces between the edges of the plates together with an adherent tape, such as a cellulosic tape having an appropriate adhesive upon a surface thereof. The charged cells were then laid flat, or nearly flat, upon their sides and when the liquid resin-forming materials therein solidified and shrank, the top plate tended, by reason of its weight, to follow the shrinkage and thus maintain the contact between the glass and the curing resin. The cleavage effects were thus materially reduced. However, any unfilled space in the cell might be spread as a large, lens-like bubble on the face of the casting. Moreover, this technique did not eliminate the excessive exothermal temperature rise which was likely to occur as the polymerization reaction progressed and the resultant discoloration and cracking phenomena attending the same. In order to overcome the latter effect, it has been heretofore disclosed to spray the cells while they were hot with cooling liquid, such as water. This obviously is a crude technique and uniform results were difficult to obtain therewith.

The present invention comprises the provision of a process of operating the same wherein the foregoing problems, taken singly or concurrently, can be successfully met. In its essence, the present invention comprises the use of casting cells for forming sheet-like bodies by interpolymerization of mixtures of the foregoing type, said cells comprising plate-like, spaced sides, the edges of which are coextensive and are sealed together by means of flexible diaphragm-like tapes, said cells beiig disposed in a liquid heat transfer medium in a bath which is provided with means accurately to control the temperature of the liquid within the cell for optimum curing. Preferably, the cells are also placed in upright, or nearly upright, position wherein they occupy minimum space and wherein there is optimum convectional circulation of the bath between the cells.

By so forming the cells and thus placing them in a heat transfer bath, the hydrostatic pressures within and without the cells are maintained in proper balance at all levels so that there is little or no tendency of the plates, even those of large size, to bow or spread unequally, or the seams to separate at the bottom of the cells, even when the latter are in vertical position during the curing operation. At the same time, the plates are free readily to follow the shrinkage of the castings as they cure so that the cells remain full at all times and premature separation of the surfaces of the castings and the plates with resultant marring of the castings cannot occur. Also, the tendency of the castings to crack or break due to internal stresses set up by the shrinkage is reduced or eliminated.

For a better understanding of the invention, reference may now be had to the accompanying drawings wherein like numerals refere to like parts throughout and wherein:

FIGURE 1 is a diagrammatic view of a curing bath for cells used in forming castings in accordance with the provisions of the present invention.

FIGURE 2 is a fragmentary sectional view through the bath taken substantially upon the line II—II of FIGURE 1.

FIGURE 3 is a sectional view taken through a cell constructed in accordance with the provisions of the present invention.

Figure 4:
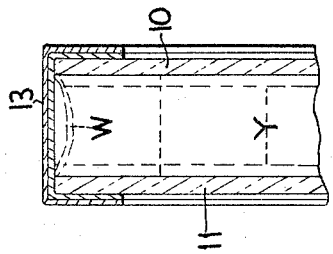
FIGURE 4 is a fragmentary sectional view illustrating more fully the taping of the edges of the cell.

As illustrated in FIGURES 3 and 4 of the drawings, a casting cell appropriate for use in the practice of the invention comprises spaced side plates 10 and 11 which are illustrated as being planar, but obviously may be bowed about a single axis or about two angularly disposed axes in order to provide castings having nonplanar faces, such as conventional wraparound windshields or other nonplanar articles. The plates 10 and 11 may also be formed to provide castings having lens effects, such as may be desirable in optics, and many other shapes. Likewise, the plates may be provided with concavities or a multiplicity of concavities or protrusions, such as might be employed in the casting of several lenses and other optical devices, simultaneously. The plates may likewise be corrugated for use, for example, in the casting of well-known corrugated sheets. The plates may be formed of sheet metal, preferably of a metal having a high polish, for example, of stainless steel, chromium plated steel, aluminum, or the like. However, the most commonly used material is glass, which may be sheet glass or ground and polished glass. If glass is employed, it is preferably tempered in well-known manner in order to increase the strength thereof and to reduce the possibility of breakage due to thermal shock. The edges of the plates are illustrated as being coextensive, but being spaced an appropriate distance. Usually, they are parallel, or nearly so, though this is not an invariable rule.

Figure 5:
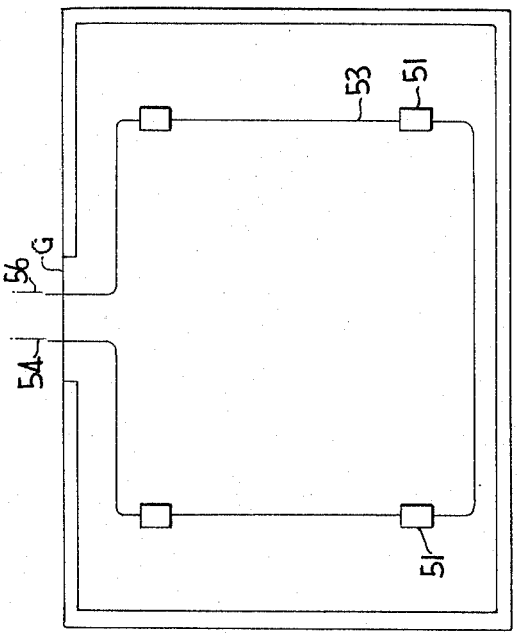
FIGURE 5 is an elevational view illustrating a stage in the assembly of a cell following a simplified technique.

The correct spacing of the plates is held by one or more layers of adhesive tape, one layer of such tape being illustrated at 12. This tape may be of paper, regenerated cellulose, or any other convenient flexible sheet material which will retain an appropriate adhesive, such as well-known pressure sensitive adhesives, and will withstand the temperatures encountered in the process, as well as the solvent action of the material being treated. A preferred material for the tape comprises the plastic material known as Mylar, which is the condensation product of ethylene glycol and terephthalic acid. A single layer of tape may be employed, but in some instances, a plurality of layers is used. If a high degree of resistance to water is required, as for instance in the curing of castings formed of a polymerizable material requiring long heating, an outer layer or layers 13 of a water-resistant tape, e.g., a tape of a metal foil, such as lead or aluminum foil, coated with an appropriate pressure-sensitive adhesive material may be used. The tape 13 as shown in FIGURES 3 and 4 may, for example, be of lead coated with a pressure-sensitive adhesive. A discontinuity or gap G, shown in FIGURES 1 and 5, is left between the ends of the tape for purposes to be described, and in the finished and charged cell, this space is closed by a short piece 12a of tape to provide a completely sealed chamber.

In order to form a casting, the foregoing cell is appropriately charged with a liquid polymerizable or interpolymerizable material. The more common varieties of such materials comprise one or more monomers containing $>C=CH_2$ groups, or a mixture of a monomer of the foregoing type and a polyester of an alpha,beta-ethylenically unsaturated dicarboxylic acid. Appropriate polyesters comprise the condensation products of polyhydric alcohols, such as propylene glycol or ethylene glycol, and a dicarboxylic acid, such as maleic acid or fumaric acid, or a mixture of maleic acid and fumaric acid and a functionally saturated dicarboxylic acid or anhydride, such as phthalic acid or succinic acid. An appropriate monomeric material for use with such polyesters comprises vinyl toluene or styrene. Examples of polyester-monomer mixtures which may be used in the practice of the invention are contained in United States Patent No. 2,593,787 to Parker.

A further castable material containing a $>C=CH_2$ group and which may be used singly or in combination with other monomers comprises alpha-chloroacrylic acid. Other castable liquid mixtures, such as those containing diallyl itaconate mixed with one or more added monomers, such as styrene, acrylonitrile or methyl methacrylate, may be used as casting media. Castable liquid polymerizable materials, such as polystyrene, that form thermoplastic bodies may also be used.

The polymerizable mixtures, if desired, may contain inhibitors of premature gelation, e.g., hydroquinone, quaternary ammonium salts and others. They may also contain catalysts such as benzoyl peroxide, cumene hydroperoxide and others well known in the art. The formation of a specific castable material is not an essential feature of the invention since substantially any of the materials heretofore employed in the formation of castings mac be employed with advantage in the practice of the present invention.

Needless to say, all or at least many of the castable materials when undergoing cure, are characterized by exothermal rise, generation of heat and by shrinkage in the reaction involved in the hardening thereof. The greater the exothermal rise and the greater the degree of shrinkage of the castings, the more advantageous is the use of the process and apparatus herein disclosed in forming the same.

In the formation of a casting in a cell as previously described, the interpolymerizable material preferably is charged into the cell in order substantially completely to fill the latter. However, it is not precluded at times to form castings in which the liquid interpolymerizable material does not fully fill the casting cell. This is permissible in the practice of the present invention inasmuch as the cells preferably are disposed in vertical position in the curing bath (to be described), in which position any air within the cell rises to the top edge and therefore does not substantially impair the character of the sheet elements formed by the casting operation. Were the cells placed in horizontal position as has heretofore been suggested in certain systems of casting, the presence of air within the cell would cause problems because it would tend to form a flattened, lenticular bubble below the face of the upper glass and would therefore constitute a serious defect in the casting.

Appropriate apparatus for heating the charged cells shown in FIGURES 3 and 4 is diagrammatically illustrated in FIGURE 1 of the drawings and comprises a suitable tank 14 having side walls 15 and a bottom 16 formed with a depressed antechamber portion 17 functioning to distribute flow of heat exchange medium in the bath in the manner to be described. The upper edge of the tank is formed with a gutter 18 extending thereabout and being designed to receive overflow liquid to be recirculated from the interior of the tank.

Bath liquid constituting a heat exchange medium in tank 14 may be substantially any suitable liquid. Preferably, it is of about the same density as the liquid in the cells so that pressures within and without the cells nearly balance. Often the bath will be slightly heavier at the start, but the casting liquid, as it polymerizes and shrinks, becomes heavier than the bath. Water is the least expensive and in most instances, the preferred liquid. Organic heat transfer media, such as ethylene glycol and many others, could also be used or could be mixed with water to provide solutions that could be used, if so desired.

Appropriate means for maintaining cells, such as cells C, in spaced, vertical position within the tank 14 is illustrated in FIGURES 1 and 2 as comprising transverse wires 19 secured at their ends to the walls of the tank. As illustrated in FIGURE 2, these wires may be used in pairs in order to keep the cells approximately parallel and to allow room for free circulation of the heat transfer medium constituting the bath between the cells. The tank is filled with heat transfer medium until it overflows into gutter 18. For purposes of maintaining the temperature of the bath and for maintaining circulation thereof along the faces of the plates constituting the side walls of the cells, appropriate apparatus is provided. This may be of any convenient form. Reliance may even be placed upon convectional flow of liquid. Coils for circulating a medium which may be heated or cool, may also be placed in tank 14, but for purposes of illustration, there is shown a loop system comprising a conduit 23 having a valve 24 and being connected at one end to the bottom portion of the depression 17, to distribute heat transfer medium into the tank 14. A perforated baffle 17a in the depression provides means to increase uniformity of distribution of upward flowing liquid across the section of said tank.

At its other end, the conduit 23 is connected to the discharge side of a suitable pump 25, such as a centrifugal pump or a gear pump. Heat transfer medium at appropriate temperature is fed to the pump by means of a conduit 26, which at one end is joined to a suitable coil 27 in a heat transfer chamber 28 having connections 29 and 30 for the introduction of cool or warm (as may be required) liquid medium designed to produce the temperature desired in the liquid passing through the coil. As shown, the conduits 29 and 30 are branched, as at 31 and 32, and these branches provide connections whereby either heating or cooling liquid, as may be required, can be selectively supplied to the chamber 28. The valves 33, 34, 36 and 37 in the branches provide means whereby the flow of heating or cooling liquid may be shut off or proportioned as required.

Thermometers 38 and 39, or other temperature-registering devices, are disposed respectively in the chambers 14 and 28 and provide means whereby the temperature of the liquid can be determined, as may be required.

The coil 27 is further connected at its upper end, as by means of conduit 41 having valve 42, with the gutter 18 whereby a complete loop circulation of the bath of heat transfer medium from the depression 17 upwardly between the spaced cells and back into the gutter can be maintained. The liquid, it will be observed, can move freely upwardly between the plates constituting the side walls of the casting cells and thus effectively remove the heat of exothermal rise and thus prevent the latter from becoming excessive. The upward movement of the liquid between contiguous cells is indicated by arrows A in FIGURE 2.

If desired, the bath may be preheated for purposes of quickly initiating the polymerization reaction, thus shortening over-all cure time.

In event that it is desired partially or completely to empty the tank 14 for convenience during loading or unloading operations, a suitable storage tank or reservoir 43 is provided. This reservoir is connected by a conduit 44 to the discharge side of the pump 25 and is connected by a line 46 to conduit 41, whereby liquid can be discharged back into the conduit 41 and through the latter to the coil 27 for temperature conditioning, as may be required. Valves 47 and 48 in the lines 44 and 46 provide means whereby the circulation of the liquid through the storage tank can be controlled at will for loop circulation through coil 27 or to or from tank 14. By suitably closing or opening the several valves of the system, it will be recognized that liquid in the storage tank 43 can be circulated through the coil 27 for heating or cooling, as may be required. If desired, the liquid in the storage tank 43 can be brought to any predetermined temperature, e.g., to curing temperature for the liquid in the cells C, in order that it may be immediately effective as a heat exchange medium when discharged to tank 14, line 49 having valve 49a to control the flow of liquid through the same. When the valves 24, 42, 47 and 49a are properly set, liquid from tank 14 can be pumped to tank 43.

Figure 6:
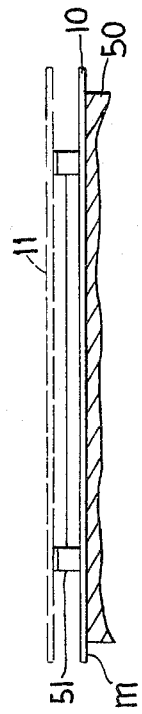
FIGURE 6 is a view further illustrating the procedure shown in FIGURE 5.
Figure 7:
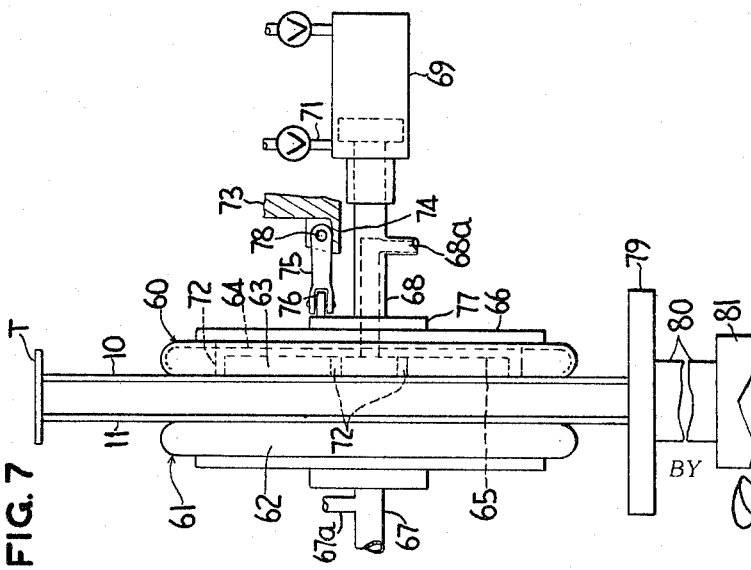
FIGURE 7 is a diagrammatic view of a more sophisticated embodiment of apparatus which may be used in the assembly of the cells shown in FIGURE 3.

Appropriate process and apparatus for forming cells for use in the practice of the invention are illustrated in FIGURES 5, 6 and 7. In the systems illustrated in FIGURES 5 and 6, an elementary embodiment of apparatus wherein the manipulations are largely manual is employed. For example, a plate, such as a plate of glass 10, constituting one side of a cell to be formed is laid down upon a suitable support, such as a table 50, with the marginal portions M of the plate projecting beyond the support in order to allow application of sealing tapes.

Means accurately to space the plate 10 and the plate 11 (the latter indicated in broken line in FIGURE 6) comprises spacer elements, such as blocks of wood 51 strung upon a string 53. The blocks, suitably spaced, are laid upon the plate 10 upon the support 50 and the ends 54 and 56 of the string are allowed to extend beyond the edges of the plate. The plate 11 may be laid upon the blocks with the edges thereof coextensive with the edges of the plate 10. The space between the edges of the two plates is then sealed in the manner already described with respect to tapes 12 and 13. It will be observed that a gap G is left between the ends of the tape for the passage of the ends of the string and for the introduction of the liquid interpolymerizable mixture. After the tapes have been suitably applied to provide a cell, the blocks are removed by pulling on the ends 54 and 56 of the connecting string. The cell may then be filled through gap G with liquid to be cast, after which the gap is closed by means of short pieces of tape 12a, which may be the same as or similar to the tape already described.

In FIGURE 7 is digrammatically illustrated a further and more sophisticated embodiment of apparatus for assembling the casting cells. In this apparatus, a pair of spaced vacuum chucks 60 and 61 are provided for holding the side plates 10 and 11 of the casting cell in properly spaced relationship with respect to each other while they are being taped together. The chucks comprise spaced, flexible rubber cups 62 and 63 designed to engage the outer faces of the plates to hold the same, the cups having bottom portions 64 which are clamped between spaced plates 65 and 66 in order to support the bottom portion. Conduits 67 and 68 provide means for the application of suction to the interior of the cups and may be connected to a source of vacuum (not shown) together with valve means for controlling the same (also not shown). The conduits may also constitute supports for the chucks and one of these, e.g., 61, is fixed from axial movement, but the other chuck, e.g., 60, is mounted for axial reciprocation a distance indicated at X, so that the space between the chucks can be varied for purposes of facilitating the insertion of plates of glass which are to be assembled in forming a cell. Any convenient means for reciprocating the chucks may be provided, for example, the remote end of the conduit 68 may be provided with a piston (not shown) reciprocating in a pneumatic cylinder 69 having suitable connections (one of which is shown) as at 71, to a source of pressure fluid, such as compressed air. Conduit 68, constituting a piston rod, may be provided with a flexible branch, e.g., hose connection 68a, providing a line to a vacuum.

For purposes of obtaining accurate spacing of the plates by the use of the chucks shown, positioning means, such as the blocks 72, may be provided upon the inner plate 64 providing limit stops for the backward movement of the plate 10 by reason of the suction action of the cup 63. Means positively to limit the chuck 60 in its backward reciprocation may further be provided and is illustrated as comprising a suitable bracket, represented at 73, and being supported upon any convenient framework (not shown) and including a hinge portion, as at 74, to which is attached a swingable arm 75, the swinging end of said arm is provided with a roller 76 and is of such length that the roller engages the face of a hub portion 77 of plate 66, thus to act as a positive stop to the backward travel of the chuck, thus assuring correct spacing of plates 10 and 11 for a given thickness of casting. The arm is pivoted, as at 78, so that it may be swung into position to engage the roller 76 with the chuck, or be swung out of the path of the latter, as may be required in the application of the chuck 60. When the plates 10 and 11 have been engaged by cups 62 and 63, the arm is lowered and chuck 60 is retracted until hub 77 engages roller 76.

Suitable means for supporting and vertically positioning the plates 10 and 11 between the chucks 60 and 61 may comprise a platform or platen 79 upon a piston 80 reciprocating in a pneumatic cylinder 81. By admitting fluid to the latter, the platen may be positioned in such vertical level as to hold the plates 10 and 11 at proper level with respect to the chucks. When the chuck 60 has been actuated to press the plates together, vacuum is applied, thus drawing the plates against stops 72. The arm 75 is lowered until hub 77 engages roller 76. The platen may then be lowered to disengage the lower edges of the plate and thus leave the latter free for the application of a tape. Subsequently, chuck 60 is retracted to engage roller 76.

A strip of pressure-sensitive tape T, in process of application, is indicated across the top edges of the plates 10 and 11 and is pressed down into engagement with said edges. If desired, the edge portions of the tape may then be folded downwardly to engage the marginal portions of the sides of the plates.

The plates 10 and 11 may be held in fixed position during the process of application of the tapes, or if preferred, the chucks may be so mounted that they can be rotated in order successively to present the edge portions of the plates to the operator without requiring him to change his position for the purpose of applying tapes thereto. For example, the conduits 67 and 68 may be mounted in bearings (not shown) so that the chucks can be rotated as the tapes are applied. To allow rotation of the conduits 67 and 68, hose connections 67a and 68a are formed with enough slack to permit at least one turn. The initial portion of tape applied to the edges of the two plates will hold them so that they will rotate concurrently.

In the practice of the invention using the apparatus and techniques described, it will be assumed that a cell C has been formed by the techniques shown in FIGURES 5 and 6 or that shown in FIGURE 7, or by other techniques. The cells then comprise the side plates 10 and 11 and the marginal tapes 12 (or 12 and 13), but with the portion G untaped. At this stage, the blocks 51 (assuming they have been used) are removed and the plates of glass are held in spaced relationship only by the flexible tapes and can therefore move freely inwardly toward each other to compensate for shrinkage of the castings in curing. The inner faces of the plates may be preliminarily coated with a well-known cleavage agent, such as a silicone resin, though this operation is not essential to the invention since separation of the castings from the plates of the cells can usually be attained without them.

The cells are filled with polymerizable or interpolymerizable material, which may be the same as any of those conventionally employed in forming resin castings. Filling of the cells may be effected at the same time that the bath is being filled so that the hydrostatic pressure within and without the cells remains balanced, or nearly balanced, at all times. Excessive tension on the tape or the bond thereof with the glass is thus avoided. Separate filling of the cells and loading into the bath in a subsequent operation is also permissible, especially with smaller sizes of cells. Preferably, filling is continued until the space between the plates 10 and 11 is completely full, or substantially completely full and portion 12a of tape is applied over the space through which the material was introduced to seal the gap G. The cell may also be but partially filled, if so desired.

The cell or cells are disposed in the tank 14 in vertical but spaced, parallel position. Any number of cells within the capacity of the tank is permissible for a load.

Liquid heat exchange medium, such as water, constituting the bath for the tank 14, may be independently brought to desired temperature, as for example, by loop circulation from storage tank 43 through the coil 27 in chamber 28, while the chamber is filled with a heat exchange medium. The temperature of the medium may be brought to such value as is desired for initiating the cure of polymerizable or interpolymerizable liquid within the cells. This temperature will depend upon the curing characteristics of the liquid being cast. However, it is also permissible to introduce the liquid at other temperature, for example, a lower temperature, into the tank 14 and then to bring the temperature, to operating value by circulation through the coil 27 while heat is supplied to chamber 28. Obviously a certain amount of time is lost in thus bringing the heat exchange bath to temperature in said tank 14. In any event, the liquid is ultimately circulated upwardly between the cells, as indicated by the arrows A in FIGURE 2, in order to attain and maintain desired temperature in the liquid in the cells C.

When the charged cells are in the tank and the bath thereabout has brought the liquid within the cells to curing temperature, an exothermal release of heat can be expected, but this can be controlled by circulating cooling liquid through the heat exchange chamber 28 while circulating liquid from the tank 14 in order to cool the same. The high rate of heat exchange between the liquid in the bath circulating between the vertically disposed cells and the liquid undergoing exothermal reaction makes excellent control of temperautre in each cell possible.

It will be recognized that as the liquid material within the cells C polymerizes and begins to gell, shrinkage is initiated and the material will tend to shrink in the manner already described, the sides of the cells moving toward each other, as for example, in the manner indicated by dotted lines Y in FIGURE 4. At the same time, the tapes about the edges of the cell may tend to be bowed, as for example, inwardly, as indicated by the dotted line at W, to maintain contact between the plates of the cells and their contents. The temperature of the bath is maintained at appropriate value accurately to control the exothermal rise of the polymerizing or interpolymerizing material in the cell until after the exothermal rise is completed. The temperature employed during the exothermal rise may be continued or, if preferred, the temperature of the bath during the final stages of cure of the material may be increased substantially, in order to effect more rapid final cure. The control is greatly enhanced by reason of the fact that the liquid is circulating between the sides of contiguous cells so that a high degree of uniformity of heating or cooling is always attainable.

The side plates 10 and 11 under the balanced forces upon opposite sides thereof, stay parallel and follow the shrinkage of the casting perfectly so that the interfaces between the plates and the casting are maintained until curing is complete. During the final stages of cure, the temperature of the bath may be raised, if desired. This usually is not essential. The time required will depend upon the curing rate of the resin, the temperature of the bath and other factors, but in general, the time is shorter than it is in a conventional apparatus wherein adequate temperature control is not attained.

When the cure is completed, the cell is lifted from the tank 14 with or without preliminary partial or complete draining of the heat exchange medium therein. The cells may be partly or completely cooled and the tapes may be stripped off from the margins of the plates. The plates can then be tripped away to leave the casting free. The faces of the latter duplicate the surfaces of the plates without lakes, cracks or other blemishes. The castings are also of good color.

Although specific examples of the invention have been set forth hereinabove, it is not intended that the invention be limited solely thereto, but to include all of the variations and modifications falling within the scope of the appended claim.

I claim:

The method of forming a sheet-like casting of a heat-polymerizable, resin-forming liquid comprising a monomer having a $CH_2=C<$ group and a polyester of an alpha,beta-ethylenically unsaturated dicarboxylic acid which in curing is subject to exothermal rise of temperature and to a substantial degree of shrinkage, said method comprising the steps of:

(A) providing a pair of plate-like elements of a material resistant to the resin-forming liquid and being spaced to give desired thickness to the casting, (B) sealing the space between the edges of the plate-like elements with flexible, water resistant, heat resistant, pressure-sensitive tape whereby to form a casting cell wherein the plate-like elements are allowed freely to approach each other to follow the shrinkage of the heat-polymerizable material as it polymerizes, (C) disposing the casting cell substantially in vertical position and filling the space between the plate-like elements with the resin-forming liquid, (D) introducing heat transfer liquid about the cell while the latter is in said vertical position at a rate substantially corresponding to the rise of the resin-forming liquid in the cell, to attain a substantial balance of hydrostatic pressure between the inner and outer faces of the plate-like elements while the space between the latter elements is being filled, (E) maintaining the heat transfer liquid in circulation in contact with the surfaces of the plate-like elements of the cell while maintaining the temperature of the heat transfer liquid at a value for obtaining the desired polymerization temperature in the polymerizable liquid, and (F) allowing the plate-like elements substantially freely to follow the shrinkage of the material in the cell as it polymerizes.

References Cited by the Examiner
UNITED STATES PATENTS

| | | |
|---|---|---|
| 965,150 | 7/1910 | Atterbury. |
| 2,369,593 | 2/1945 | Marks et al. |
| 2,385,486 | 9/1945 | Bartoe et al. |
| 2,485,798 | 10/1949 | Whyte et al. |
| 2,687,555 | 8/1954 | Anspon et al. |
| 2,887,759 | 5/1959 | Brownell. |
| 3,050,787 | 8/1962 | Richardson et al. ____ 264—342 |

FOREIGN PATENTS

| | | |
|---|---|---|
| 458,874 | 8/1949 | Canada. |

ROBERT F. WHITE, Primary Examiner.

MORRIS SUSSMAN, ALEXANDER H. BRODMERKEL, Examiners.

F. MARLOWE, L. S. SQUIRES, Assistant Examiners.